United States Patent [19]

Ruike

[11] Patent Number: 4,663,531

[45] Date of Patent: May 5, 1987

[54] MECHANISM TO MOUNT A COLLIMATOR TO A RADIATION DETECTOR OF A NUCLEAR MEDICINE DIAGNOSTIC APPARATUS

[75] Inventor: Toshikatsu Ruike, Tochigi, Japan

[73] Assignee: Kabushiki Kaisha Toshiba, Kawasaki, Japan

[21] Appl. No.: 698,375

[22] Filed: Feb. 5, 1985

[30] Foreign Application Priority Data

Feb. 9, 1984 [JP] Japan ................................ 59-20811

[51] Int. Cl.⁴ ........................ G01T 1/20; G21K 1/02

[52] U.S. Cl. ........................ 250/363 S; 250/505.1; 378/147

[58] Field of Search ........................ 250/505.1, 363 S; 378/147, 148, 149, 205

[56] References Cited

U.S. PATENT DOCUMENTS 4,438,335 3/1984 Meeder ................................ 378/148
4,532,645 7/1985 Morris ................................ 378/205
4,560,876 12/1985 Meeder ................................ 378/149

*Primary Examiner*—Carolyn E. Fields
*Assistant Examiner*—Richard Hanig
*Attorney, Agent, or Firm*—Cushman, Darby & Cushman

[57] ABSTRACT

Mounting pins having a head portion are provided on the detector member of a nuclear medicine diagnostic apparatus while a coupling mechanism associated with a collimator is registrable with the mounting pin. The coupling mechanism includes an entrance aperture sized and configured to accept the head portion therein and claw members adjacent to the aperture for engagement with the head portion. The mounting pin and coupling mechanism together cooperate to permit the head portion to be accepted in the entrance aperture when the collimator member is in a dismounted position and to permit the claw member to be moved into engagement with the head portion in response to relative movement between the collimator and detector members in a mounting direction between the dismounted position and a mounted position. A biasing mechanism is preferably provided so as to forcibly urge the claw member against the head portion to securely retain the claw member thereagainst. Cam surfaces are also preferably provided on the forward end portion of the claw member such that upon relative movement between the collimator and radiation detector members, the cam surfaces responsively effect displacement of the biasing mechanism into a retracted position so as to aid in mounting of the collimator.

27 Claims, 9 Drawing Figures

MECHANISM TO MOUNT A COLLIMATOR TO A RADIATION DETECTOR OF A NUCLEAR MEDICINE DIAGNOSTIC APPARATUS

FIELD OF INVENTION

The present invention relates to a mounting mechanism particularly well-suited for the mounting of a collimator member to a radiation detector member associated with a nuclear medicine diagnostic apparatus.

BACKGROUND AND SUMMARY OF THE INVENTION

Nuclear medicine diagnostic procedures have increasingly become more popular as a non-invasive means to examine a patient's internal organs, tissue or the like. Nuclear medicine generally encompasses a diagnostic procedure whereby a patient ingests a radioactive material which is then sensed by a radiation detector external of the patient. In such a manner, the radioactive material will provide a source of radiation such that the detector will be capable of mapping and/or imaging the radiation source in the patient's organs.

Different radioactive materials have been identified as being selective to different organs and/or tissues in a human body. Thus, a physician will typically select a particular radioactive material in dependence upon the organ and/or tissue for which diagnostic procedures are desired.

In a nuclear medicine diagnostic apparatus, it is therefore necessary to use a collimator in association with a radiation detector designed for the particular radiation source that is being detected. Therefore, it is necessary for a physician or medical technician to insure that the proper type of collimator is being utilized for the radiation source to be detected prior to conducting the diagnostic procedure. Changing a collimator mounted on the radiation detector of a nuclear medicine diagnostic apparatus for a different collimator inevitably occurs when a different radiation source is to be detected.

Conventional mounting of a collimator to radiation detector is accomplished by means of screws, bolts or the like. As can be appreciated, such conventional mounting techniques present problems since loosening and tightening the screws in order to securely position and mount a collimator to a radiation detector is fairly troublesome and time-consuming.

The present invention solves such a problem by providing a mounting mechanism for mounting the collimator on a radiation detector in a nuclear medicine diagnostic apparatus which is both easy to manipulate while yet insuring proper positioning of the collimator on the radiation detector. Thus, in accordance with the present invention, mounting pins having a head portion are preferably provided in association with the radiation detector while a pair of claw members are defined on the collimator. An entrance aperture is provided at the forward end of the claw members and is sized and configured so as to accept the head portion of the mounting pin therein. Accordingly, the mounting mechanism of the present invention permits simplified mounting of a collimator to a radiation detector for a nuclear medicine diagnostic apparatus by capturing the claw members in a mounting space established between the head portion of the mounting pin and the radiation detector.

Preferably, the claw member is biased into forcible engagement with the head portion of the mounting pin when the collimator is in its mounted position so as to prevent play between the collimator and the mounting pin. In one embodiment of the present invention, this bias force is established by a boss member reciprocally moveable within a recessed surface defined in the radiation detector and biased in a direction to forcibly engage the collimator which in turn is forced against the head portion of the mounting pin. A second embodiment of the present invention contemplates that a recessed guide surface is defined in the collimator and establishes two different depth levels such that the boss member will be displaced against the bias force of a spring to similarly urge the collimator and claw members against the head portion of the mounting pins.

A spring-loaded detent member is also provided in accordance with the present invention so as to not only establish the mounted position of the collimator relative to the radiation detector but to also removeably lock the collimator in its mounted position. Like the boss member described above, the detent member of the present invention is moveable within a recess and enters a locking aperture when the collimator reaches its mounted position.

While the various structures of the present invention have been briefly described above and will be described in more detail below as being associated with either the collimator or the radiation detector, the reader should appreciate that the opposite structural arrangements could also be provided without destroying the functioning of the present invention. That is, for example, the mounting pins could be provided on the collimator with the claw members provided with the radiation detector.

Other objects and advantages of the present invention will become more clear after careful consideration is given to the detailed description of the preferred exemplary embodiments thereof which follow.

BRIEF DESCRIPTION OF THE ACCOMPANYING DRAWINGS

Reference will be hereinafter made to the accompanying drawings wherein like reference numerals throughout the various figures denote like structural elements and wherein.

DETAILED DESCRIPTION OF THE PREFERRED EXEMPLARY EMBODIMENTS

Figure 1:
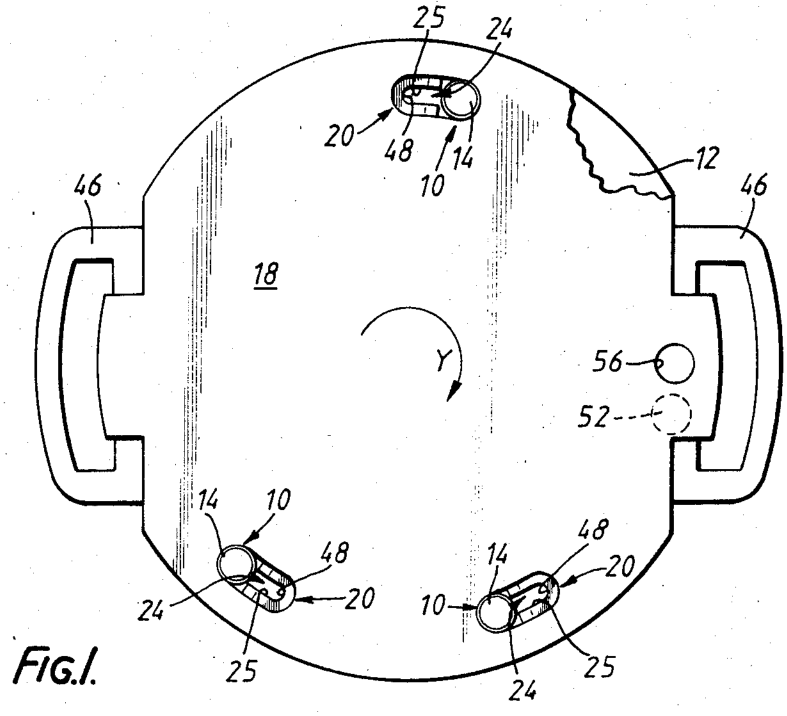
FIG. 1 is a plan view of a collimator and radiation detector showing the mounting mechanism of the present invention wherein the collimator is in a dismounted position relative to the radiation detector.
Figure 2:
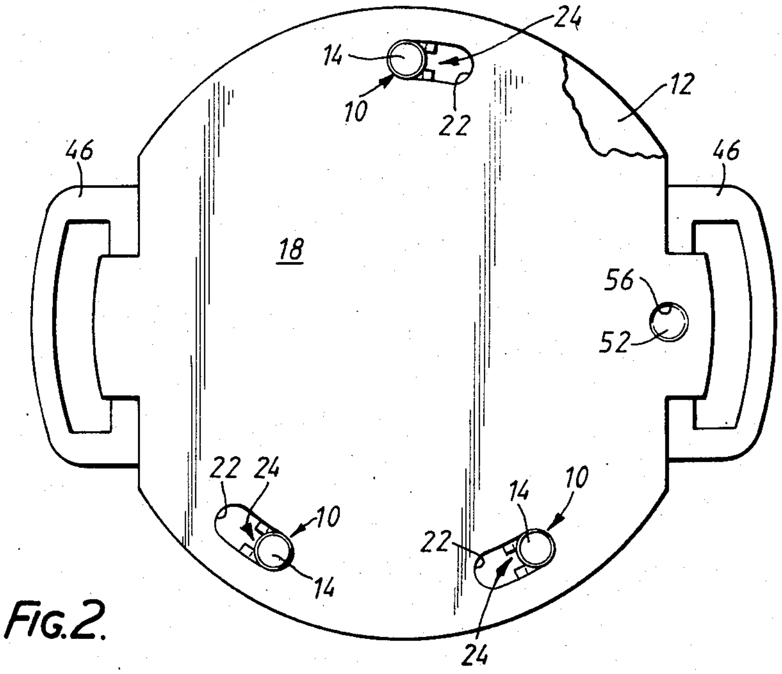
FIG. 2 is a plan view of the collimator and radiation detector similar to FIG. 1 with the exception that the collimator is shown in a mounted position.

Referring to FIGS. 1 and 2, the mounting mechanism of the present invention generally includes plural mounting pins 10 rigidly fixed to the radiation detector 12. Each mounting pin 10 includes an upper head portion 14 spaced above the mounting surface 16 of the radiation detector 12 so as to establish a mounting space the purpose of which will be described in more detail below with reference to FIGS. 3A–3C. Preferably, the plural mounting pins 10 are radially spaced apart relative to one another about a predetermined arc so as to permit the mounting of collimator 18 by turning movement being applied thereto in the direction of arrow Y as seen in FIG. 1.

Collimator 18 defines plural coupling members 20 each registrable with a respective one of the head portions 14 of mounting pins 10. Each coupling member 20 includes an entrance aperture 22 sized and configured so as to permit head portion 14 to pass therethrough. Adjacent to entrance aperture 22, there is provided a U-shaped claw member 24 defining a mounting aperture 25 which permits the stem portion 26 (see FIGS. 3A–3C) of each mounting pin 10 to be accepted therein when the collimator 18 is turned in a direction noted by direction Y in FIG. 1.

Figure 3A:
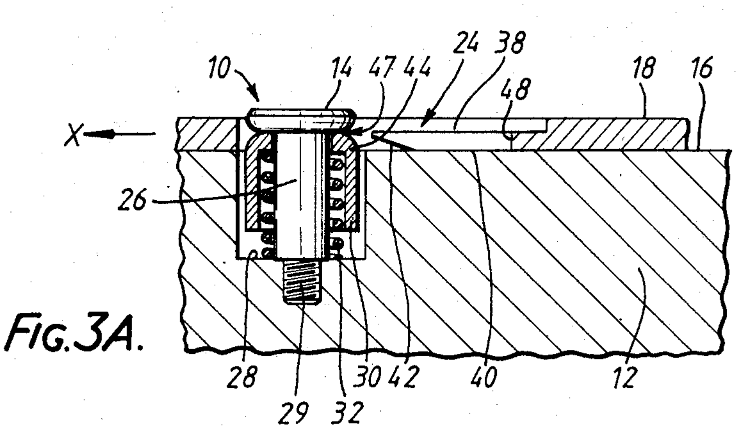
FIGS. 3A–3C are cross-sectional elevational views showing the relationship between a representative mounting pin and claw member of the present invention when the collimator is in dismounted, intermediate, and mounted positions, respectively.
Figure 3B:
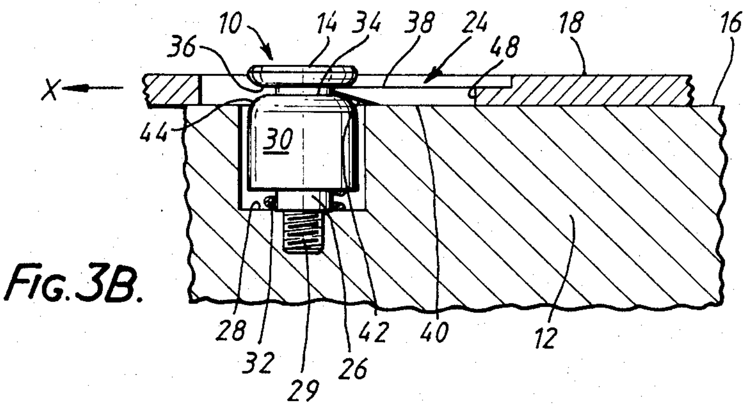
Figure 3C:
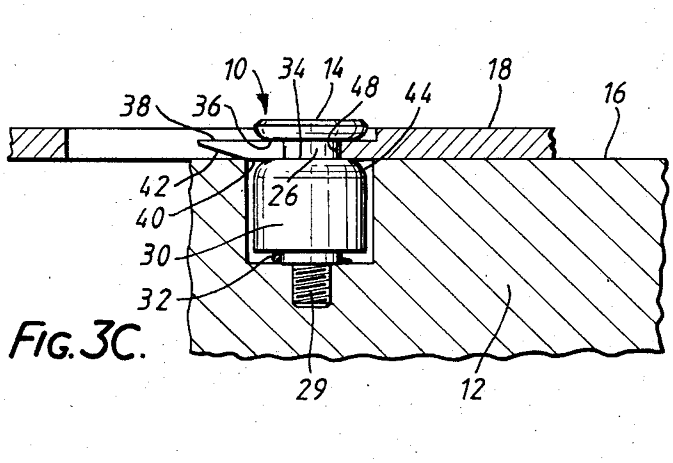

The relationship between the coupling members 20 and the mounting pins 10 of the present invention can be more fully understood by referring to accompanying FIGS. 3A–3C. Each mounting pin 10 includes a stem portion 26 having a lower threaded end 29 for rigidly fixing mounting pin 10 to the radiation detector 12. A recessed surface 28 is defined in detector 12 so as to be annularly disposed relative to stem portion 26 of mounting pin 10. A boss member 30 is housed within recess surface 28 and is slidably reciprocally moveable between an advanced position (as shown in FIG. 3A) and a retracted position (as shown in FIG. 3C). A biasing spring 32 forcibly biases boss member 30 into the extended position so that the engaging surface 34 thereof is forcibly engaged with a bearing surface 36 of mounting pin 10 when the collimator 18 is in a dismounted position (i.e. as shown in FIG. 3A).

The claw member 24 is preferably longer than the diameter of head portion 14 and includes upper and lower surfaces 38, 40 which respectively engage the mounting surface 16 of detector 12 and bearing surface 36 of mounting pin 10 when collimator 18 is in its mounted position. In such a manner, claw members 24 are disposed in the mounting space established between the bearing surface 36 of mounting pin 10 and the mounting surface 16 of detector 12 when collimator 18 is in its mounted position.

The forward end portion of claw member 24 preferably defines a wedge-shaped cam surface 42 which cooperates with chamfered surface 44 perimetrically disposed around engaging surface 34 of boss member 30. Preferably chamfered surface 44 is a smoothly rounded convex surface as shown in FIGS. 3A–3C but other surfaces could be provided such as planar, concave and/or combinations thereof.

To mount collimator 18 to the mounting surface 16 of radiation detector 12, entrance apertures 22 are registered with head portions 14 of respective mounting pins 10 as shown in FIG. 3A. Upon turning movement being applied to collimator 18 such as, by means of handles 46 (see FIGS. 1 and 2) in a direction noted by arrow Y, localized relative movement between mounting pins 10 and claw members 24 in the direction noted by arrow X in FIGS. 3A–3C results. Upon continued turning movement of collimator 18 in the direction indicated by arrow Y in FIG. 1, cam surface 42 of claw member 24 is caused to engage chamfered surface 44 of boss member 30 by movement into nip area 47. Cam surface 42 thereby responsively displaces boss member 30 in a direction towards its retracted position due to the wedge-shape of cam surface 42. Thus, cam surface 42 of claw member 24 translates movement of collimator 18 in the direction noted by arrow Y in FIGS. 3A–3C into displacement of boss member 30 in a direction towards its retracted position as shown more specifically in FIG. 3B.

At the same time, stem portion 26 initially enters the mounting aperture 25 while upper claw surface 38 is caused to bear against bearing surface 36 of head portion 14. Upon further turning movement of collimator 18, stem portion 26 will be seated against the closed end 48 of aperture 25 as shown in FIG. 3C. In this position, the bias force provided by biasing spring 32 forcibly urges boss member 30 and thus its engaging surface 34 against the lower claw surface 40 which, in turn, forcibly urges the upper claw surface 38 into engagement with bearing surface 36 of head portion 14. As such, claw member 24 is positively captured between the engaging surface 34 of boss member 30 and the bearing surface 36 of head portion 14.

Similar capturing functions could be provided by judiciously selecting the width of claw member 24 so that it closely fits in the mounting space defined between the bearing surface 36 of head portion 14 and the mounting surface 16 of detector 12 so as to effect frictional engagement therewith when collimator 18 is in its mounted position. However, in order to promote ease of mounting and to insure that play in the vertical direction as seen in FIGS. 3A–3C is eliminated, it is preferred to have the forced-capturing functions provided by boss member 30 as described previously.

Figure 4A:
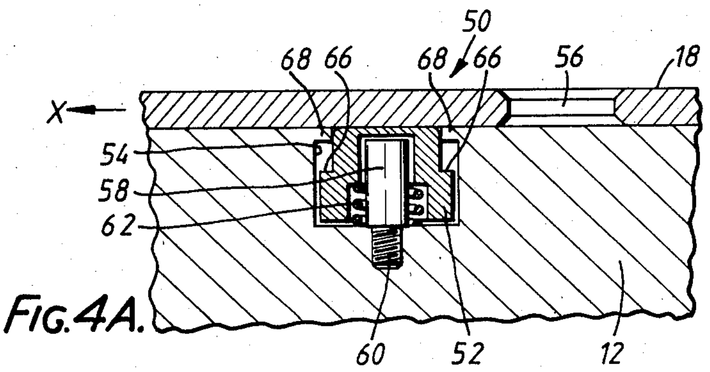
FIGS. 4A–4C are cross-sectional elevational views showing the relationship between the detent member and locking aperture of the present invention when the collimator is in dismounted, intermediate, and mounted positions, respectively.

In order to insure proper positioning of the collimator 18 relative to radiation detector 12 when collimator 18 is in its mounted position, the present invention provides a positioning pin assembly 50 generally including a positioning pin 52 housed within a recessed cavity 54 defined in radiation detector 12 and a locking aperture 56 defined in collimator 18. Positioning pin 52 is mounted for reciprocal movement between a retracted position (as shown in FIG. 4A) and an advanced position (as shown in FIG. 4C) in a similar manner to that described above with respect to boss 30. That is, a positioning stem portion 58 is rigidly fixed to radiation detector 12 by means of a lower threaded portion 60 and is centrally disposed is recess cavity 54. A biasing spring 62 is operatively connected to positioning pin 52 so as to forcibly urge the latter into its extended position.

Locking aperture 56 is defined in collimator 18 such that when collimator 18 is in its mounted position, locking aperture 56 registers with positioning pin 52 so that the latter is capable of being forcibly extended up through locking aperture 56 thereby precisely positioning collimator 18 relative to detector 12. Positioning pin 52 preferably defines shoulder surfaces 66 which engage with limit flanges 68 when positioning pin 52 is in its extended position as can be seen in FIG. 4C. Thus, the interengagement of shoulder surfaces 66 and limit flanges 68 together cooperate so as to establish the uppermost travel limit of positioning pin 52 thereby establishing its extended position.

Figure 4B:
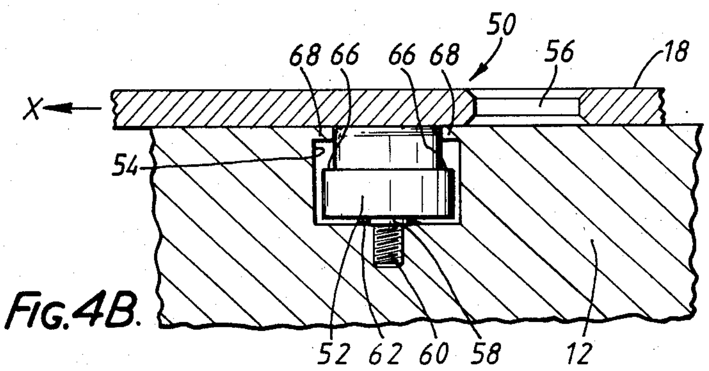
Figure 4C:
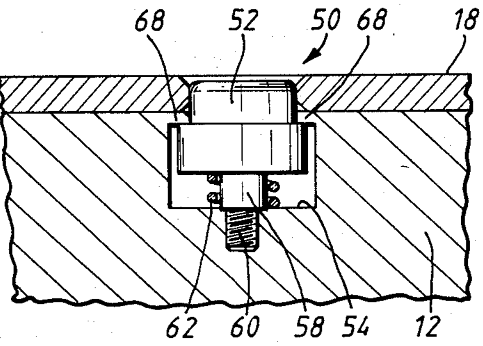

As collimator 18 is turned in the direction of arrow Y in FIG. 1, similar localized directional movement in the direction of arrow X in FIGS. 4A–4C results. Collimator 18 thus causes positioning pin 52 to be accepted within recessed cavity 54 during mounting of collimator 18 to radiation detector 12 as can be seen in FIGS. 4A and 4B. Once collimator 18 is moved into its mounted position as described previously, locking aperture 56 is thus registered with positioning pin 52 and, due to the bias force provided by spring 62, positioning pin 52 is caused to be extended into locking aperture 56. In order to dismount collimator 18 from radiation detector 12, it will of course be necessary to first manually depress positioning pin 52 into recess cavity 54 while turning collimator 18 in a direction opposite to arrow Y so that positioning pin 52 will bear against the lower surface of collimator 18. In such a manner, the positioning pin assembly 50 of the present invention provides accurate positioning of the collimator 18 relative to radiation detector 12 while at the same time establishing removable locking engagement therebetween.

Figure 5:
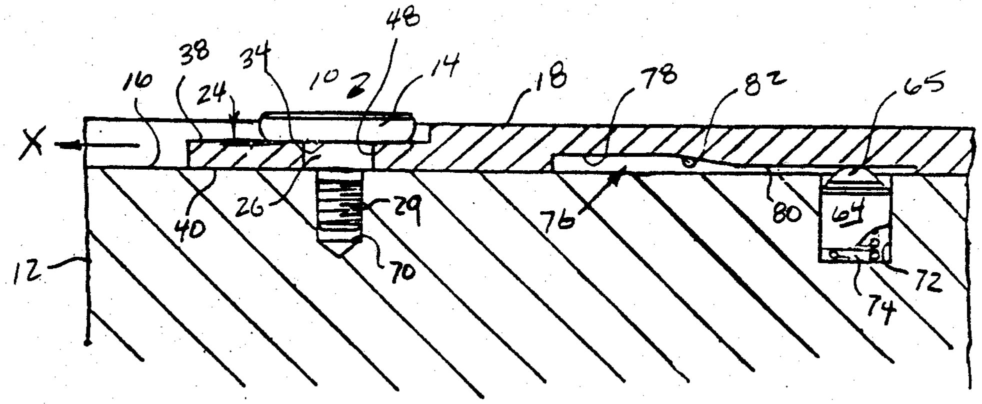
FIG. 5 is a cross-sectional representative view of another embodiment of the mounting mechanism in accordance with the present invention.

A second embodiment of the coupling system of the present invention can be seen by reference to FIG. 5. Like the embodiment described above with reference to FIGS. 3A–3C, the embodiment shown in FIG. 5 includes a mounting pin 10 having a stem portion 26 threadably fixed to radiation detector 12 by means of threaded interengagement between threaded portion 29 and tapped hole 70. Head portion 14 similarly defines an engaging surface 34 which establishes with mounting surface 16 of radiation detector 12 a mounting space into which claw member 24 is received such that upper and lower claw surfaces 38, 40 respectively, bear against the engaging surface 34 of head portion 14 and the mounting surface 16 of radiation detector 12 when collimator 18 is in its mounted position.

The embodiment of FIG. 5 provides for boss member 64 being spaced laterally of mounting pin 10 and upstream thereof relative to the local direction of movement of collimator 18 during mounting thereof (arrow X). Boss member 64 is reciprocally moveable in recessed surface 72 between extended and retracted positions similar to boss member 30 of FIGS. 3A–3C described above. Biasing spring 74 is operatively coupled to boss member 64 so as to urge the engaging surface 65 thereof into engagement with collimator 18. That is, biasing spring 74 forcibly urges boss member 64 into its extended position.

Recessed guide groove 76 is defined in collimator 18 in confronting relationship to boss member 64 and preferably includes a first planar recessed surface 78 establishing a first depth and a second recessed surface 80 establishing a second depth less than the first depth. A planar connection surface 82 is disposed so as to connect the first and second surfaces 78, 80, respectively, and is downwardly slanted in a direction opposite to the localized direction of movement of collimator 18 during mounting thereof (arrow X).

Guide groove 76 is positioned in collimator 18 such that when the head portion 14 of mounting pin 10 enters the entrance aperture 22 (i.e. when collimator 18 is in a dismounted position), engaging surface 65 of boss member 64 bears against first surface 78. Thereafter, when relative movement is effected between collimator 18 and radiation detector 12 as shown by arrow X in FIG. 5, claw member 24 will thus be positioned between head portion 14 and detector 12 while, simultaneously, engaging surface 65 progressively moves from first surface 78 to interconnecting surface 82 and then on to second surface 80. Since second surface 80 establishes a shallower depth than first surface 78, boss member 64 is responsively caused to be displaced in a direction towards its retracted position thereby compressing spring 74. Thus, spring 74 exerts a bias force against boss member 64 urging engaging surface 65 into forcible engagement against second surface 80 which, in turn, causes claw member 24 to be forcibly urged against bearing surface 36 of head portion 14 thereby securely yet removably mounting collimator 18 to radiation detector 12.

Preferably, engaging surface 65 defines a convex arcuate surface so that it more easily travels across surfaces 78, 80 and 82. The embodiment of FIG. 5 also preferably includes the positioning pin and locking aperture 52, 56 arrangement described previously so as to accurately position collimator 18 relative to radiation detector 12.

While the present invention has been herein described in what is presently conceived to be the most preferred embodiments thereof, those in the art may realize that many modifications may be made hereof, which modifications shall be accorded the broadest scope of the appended claims so as to encompass all equivalent structures and/or assemblies.

What is claimed is:

1. A mounting mechanism for a nuclear medicine diagnostic apparatus to removably mount a collimator member to a radiation detector member, said mounting mechanism comprising:

mounting pin means associated with one member of said collimator or detector members and including a head portion defining a lower bearing surface, said head portion being rigidly fixed to and spaced above said one member to establish therewith a mounting space; and coupling means associated with the other member of said collimator or detector members and registrable with said mounting pin means, said coupling means including means defining an entrance aperture sized and configured to accept said head portion therein, and claw means adjacent said aperture for engagement with said head portion, wherein said mounting pin means and said coupling means together cooperating for (a) permitting said head portion to be accepted in said entrance aperture when said collimator member is in a dismounted position and (b) permitting said claw means to be moved into said mounting space in response to relative movement between said collimator and detector members in a mounting direction between said dismounted position and a mounted position of said collimator member to thereby capture said claw means between said other member and said bearing surface whereby said collimator member is removeably mounted to said detector member.

2. A mounting mechanism as in claim 1 further comprising biasing means operable against said other member for exerting a bias force against said other member in a direction causing said claw means to be forcibly urged against said bearing surface of said head portion when said collimator member is moved into said mounted position.

3. A mounting mechanism as in claim 2 wherein said one member includes means defining a recessed surface and wherein said biasing means includes:

boss means housed within said recessed surface and defining an upper engagement surface for engaging said other member, said boss means reciprocally displaceable in said recessed surface between extended and retracted positions; and spring means connected to said boss means for biasing said boss means into said extended position to cause said engagement surface to forcibly engage said other member.

4. A mounting mechanism as in claim 3 wherein said recessed surface is annularly disposed relative to said mounting pin means and wherein said boss means is positioned in said recessed surface such that said engaging surface is in opposing relationship to said bearing surface of said head portion, said spring means thereby biasing said boss means so that said engagement surface is caused to forcibly engage said bearing surface of said head portion when said collimator member is in said dismounted position.

5. A mounting mechanism as in claim 4 wherein said boss means includes means defining a chamfered surface peripherally of said engaging surface, said chamfered surface establishing a nip area with said bearing surface when said boss means is in said extended position.

6. A mounting mechanism as in claim 5 wherein said claw means includes, at a forward end thereof, means defining a cam surface engageable with said chamfered surface of said boss means and moveable into said nip area upon said relative movement between said collimator and detector members in said mounting direction, said cam surface defining means for responsively translating said relative movement in said mounting direction into displacement of said boss means in a direction towards said retracted position thereof, whereby upon said collimator member reaching said mounted position, said engaging surface forcibly engages said claw means to thereby in turn forcibly urge said claw means against said bearing surface of said head portion.

7. A mounting mechanism as in claim 5 wherein said chamfered surface is a convexly curved surface.

8. A mounting mechanism as in claim 4 wherein said claw means includes, at a forward portion thereof, means defining a cam surface engageable with said boss means for responsively translating said relative movement between said collimator and detector members in said mounting direction into displacement of said boss means in a direction towards said retracted position.

9. A mounting mechanism as in claim 8 wherein said cam surface defining means defines a wedge-shaped surface.

10. A mounting mechanism as in claim 3 further comprising means defining a guide surface associated with said other member and registrable with said engaging surface of said boss means as said collimator and detector members are moved relative to one another in said mounting direction between said dismounted and mounted positions, said guide surface defining means for translating said relative movement in said mounting direction into displacement of said boss means in a direction towards said retracted position.

11. A mounting mechanism as in claim 10 wherein said guide surface defining means defines a first surface establishing a first level, a second surface rearward of said first surface relative to said mounting direction to establish a second level less than said first level, and a connecting surface intermediate of and connecting said first and second surfaces, wherein said first, intermediate and second surfaces together establish said guide surface such that said engaging surface registers with said first surface when said collimator is in said dismounted position and sequentially moves along said intermediate surface to said second surface to displace said boss means in response to said relative movement in said mounting direction.

12. A mounting mechanism as in claim 11 wherein said first and second surfaces are parallel to said mounting surface and said connecting surface is a downward inclined planar surface.

13. A mounting mechanism as in claim 1 further comprising positioning pin means for establishing said mounted position of said collimator and for removably locking said collimator at said mounted position.

14. A mounting mechanism as in claim 13 wherein said positioning pin means includes a positioning pin associated with said one member and a locking aperture associated with said other member, said positioning pin being moveable into said locking aperture when said collimator member reaches said mounted position.

15. A mounting mechanism as in claim 3 further comprising positioning pin means for establishing said mounted position of said collimator and for removably locking said collimator at said mounted position.

16. A mounting mechanism as in claim 15 wherein said positioning pin means includes a positioning pin associated with said one member and a locking aperture associated with said other member, said positioning pin being moveable into said locking aperture when said collimator member reaches said mounted position.

17. A mounting mechanism as in claim 1 wherein said mounting pin means includes stem means to rigidly fix said head portion to said one member.

18. A mounting mechanism as in claim 17 wherein said claw means includes a pair of claw members spaced apart relative to one another to define therebetween a mounting aperture in communication with said entrance aperture, said mounting aperture accepting a portion of said stem means therein upon said relative movement between said collimator and detector members in said mounting direction.

19. A mounting mechanism as in claim 3 wherein said mounting pin means includes stem means to rigidly fix said head portion to said one member.

20. A mounting mechanism as in claim 19 wherein said claw means includes a pair of claw members spaced apart relative to one another to define therebetween a mounting aperture in communication with said entrance aperture, said mounting aperture accepting a portion of said stem means therein upon said relative movement between said collimator and detector members in said mounting direction.

21. A mounting mechanism as in claim 20 wherein each said claw member at forward portion thereof includes means defining a cam surface engageable with said boss means for responsively translating said relative movement between said collimator and detector members in said mounting direction into displacement of said boss means in a direction towards said retracted position.

22. A mounting mechanism as in claim 21 wherein said cam surface defining means defines a wedge-shaped surface.

23. A mounting mechanism as in claim 14 wherein said positioning pin includes limit means to limit the amount of movement of said positioning pin and thus establish a limit position thereof.

24. A mounting mechanism as in claim 23 wherein said limit means includes a limit flange to establish said limit position, and means defining shoulders on said detent member, said shoulders bearing against said limit flange when said detent member is in said limit position.

25. A mounting mechanism as in claim 1 comprising a plurality of said mounting pin means and a plurality of said claw means, each said mounting pin means being registrable with a respective one of said claw means.

26. A mounting mechanism as in claim 25 wherein said plurality of mounting pin means and said claw means are radially spaced apart along a predetermined arc.

27. In a nuclear medicine diagnostic apparatus of the type including radiation detecting means for detecting radiation and defining a mounting surface, collimator means for guiding radiation to said radiation detecting means, and mounting means for mounting said collimator means in juxtaposition with said mounting surface of said radiation detecting means, the improvement wherein said mounting means comprises:

mounting pin means associated with said radiation detecting means and including a head portion defining a lower bearing surface, said head portion being rigidly fixed to said radiation detecting means and spaced above said mounting surface, said mounting surface and said bearing surface thereby establishing a mounting space; and coupling means associated with said collimator means and registrable with said mounting pin means, said coupling means including means defining an entrance aperture sized and configured to accept said head portion therein, and claw means adjacent said entrance aperture for engagement with said head portion, wherein said mounting pin means and said coupling means together cooperate for (a) permitting said head portion to be accepted in said entrance aperture when said collimator member is in a dismounted position and (b) permitting said claw means to be moved into said mounting space in response to said collimator being moved in a mounting direction between said disengaged position and a mounted position to thereby capture said claw means between said mounting and bearing surfaces whereby said collimator means is removeably mounted to said radiation detecting means.

* * * * *